United States Patent
Kato et al.

(10) Patent No.: US 7,030,606 B2
(45) Date of Patent: Apr. 18, 2006

(54) ANGULAR SENSOR WITH A MAGNETO-ELECTRIC TRANSDUCER AND A MAGNETIC DEFLECTION DEVICE

(75) Inventors: Yukihiro Kato, Aichi-ken (JP); Kenichi Taguchi, Aichi-ken (JP); Satoru Tagawa, Aichi-ken (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/206,953

(22) Filed: Jul. 30, 2002

(65) Prior Publication Data
US 2003/0020468 A1    Jan. 30, 2003

(30) Foreign Application Priority Data
Jul. 30, 2001   (JP) ............................. 2001-230555

(51) Int. Cl.
*G01B 7/30*    (2006.01)

(52) U.S. Cl. ............................. 324/207.25; 324/207.2

(58) Field of Classification Search ........... 324/207.12, 324/207.2–207.21, 207.25–207.26; 338/32 R, 338/32 H
See application file for complete search history.

(56) References Cited

U.S. PATENT DOCUMENTS

| | | | | |
|---|---|---|---|---|
| 5,164,668 A | * | 11/1992 | Alfors | 324/207.2 |
| 5,332,965 A | * | 7/1994 | Wolf et al. | 324/207.12 |
| 5,444,369 A | * | 8/1995 | Luetzow | 324/207.2 |
| 5,781,005 A | * | 7/1998 | Vig et al. | 324/207.2 |
| 5,861,745 A | * | 1/1999 | Herden | 324/207.2 |
| 6,018,241 A | * | 1/2000 | White et al. | 324/207.2 |
| 6,232,771 B1 | * | 5/2001 | Herden et al. | 324/207.25 |
| 6,417,664 B1 | * | 7/2002 | Ventroni et al. | 324/207.2 |
| 6,476,600 B1 | * | 11/2002 | Kono et al. | 324/207.2 |
| 6,753,681 B1 | | 6/2004 | Enomoto et al. | |

FOREIGN PATENT DOCUMENTS

| | | |
|---|---|---|
| DE | 4317259 A1 | 11/1993 |
| DE | 102 17 601 A1 | 11/2002 |
| EP | 0733881 A2 | 9/1996 |
| EP | 1061341 A2 | 12/2000 |
| JP | 63-146707 U | 9/1988 |
| JP | 2920179 B2 | 7/1999 |

OTHER PUBLICATIONS

German Office Action dated Aug. 19, 2003.

* cited by examiner

*Primary Examiner*—Jay Patidar
(74) *Attorney, Agent, or Firm*—Sughrue Mion, PLLC

(57) ABSTRACT

An angular sensor which enables to obtain an output signal proportional to a relative rotational angle with low manufacturing cost and with miniaturized size. An angular sensor which includes a first magnet and a second magnet fixed to a rotation body, magnetic flux sensing surface is fixed to the stator to be positioned in magnetic field between the first magnet and the second magnet and perpendicular to magnetic sensing direction for sensing a magnetic flux, a magneto-electric transducer element for outputting an electric signal corresponding to a magnetic sensing direction element of the magnetic density, deflection yokes. The deflection yokes are positioned facing the magnetic flux sensing surfaces. The deflection yokes are positioned within a range of three quarters of a distance between the first magnet and the second magnet in X-axis direction and one half of a distance between the first magnet and the second magnet in Y-axis direction.

2 Claims, 4 Drawing Sheets

ANGULAR SENSOR WITH A MAGNETO-ELECTRIC TRANSDUCER AND A MAGNETIC DEFLECTION DEVICE

This application is based on and claims priority under 35 U.S.C. § 119 with respect to Japanese Application No. 2001-230555 filed on Jul. 30, 2002, the entire content of which is incorporated herein by reference.

1. Filed of the Invention

The present invention relates to an angular sensor. More particularly, the present invention pertains to an angular sensor for detecting a relative rotational angle between a stator and a rotor using a magneto-electric transducer element for converting the sensed magnetic flux density into an electric signal.

2. Background of the Invention

A known angular sensor is disclosed in Japanese Patent No. 2920179. This known angular sensor includes an annular magnet having different magnetic poles on internal surface and external surface thereof respectively. The annular magnet rotates in a main magnetic pole clearance between two magnetic parts. One of the magnetic parts corresponds to two stators forming a secondary magnetic pole clearance therebetween for accommodating a hall element. Two stators are positioned inside of the annular magnet. The other magnetic part is constructed with an annular yoke, which is coaxial with the annular magnet. The cylindrical main magnetic pole clearance is constructed with each stator and the annular magnet.

With the known angular sensor mentioned above, the magnetic flux in accordance with the relative rotational angle between the sensor and the annular yoke is deflected with two stators. The magnetic flux in accordance with the relative rotational angle between the sensor and the annular yoke is passed through the secondary magnetic pole clearance to output the electric signal corresponding to the passing magnetic flux through the hall element positioned in the secondary magnetic pole clearance. Thus, the relative rotational angle between the sensor and the annular yoke is detected.

With the known angular sensor, because the magnetic flux proportional to the relative rotational angle passes through the secondary magnetic pole clearance, the output signal proportional to the relative rotational angle between the sensor and the annular yoke can be obtained.

Notwithstanding, with the known angular sensor mentioned above, because two stators forming the sensor are configured to be semicircle mating along an internal diameter of the annular magnet, the configuration is complicated, the size of the stators is increased, and the manufacturing cost of the angular sensor is increased. Furthermore, the angular sensor is unlikely miniaturized due to the complex configuration such as annular magnet and the semicircle stators.

A need exists for an angular sensor which is able to obtain an output signal proportional to the relative rotational angle and which is able to be miniaturized with low manufacturing cost.

SUMMARY OF THE INVENTION

In light of the foregoing, the present invention provides an angular sensor which includes a stator, a rotor rotatable relative to the stator, a first magnet fixed to the rotor, and a second magnet fixed to the rotor opposing to the first magnet. The angular sensor further includes a magneto-electric transducer element fixed to the stator to be positioned in a magnetic field generated between the first magnet and the second magnet and having a magnetic flux sensing surface perpendicular to magnetic sensing direction for sensing a magnetic flux for outputting an electric signal corresponding to a magnetic sensing directional element of a magnetic flux density. The angular sensor still further includes a deflection yoke made of magnetic material and fixed to the stator to be positioned in the magnetic field generated between the first magnet and the second magnet. With the angular sensor of the foregoing construction, a relative rotational angle between the stator and the rotor are detected in accordance with the electric signal outputted from the magneto-electric transducer element. The deflection yoke is positioned facing the magnetic flux sensing surface and positioned within a range of three quarters of a distance between the first magnet and the second magnet opposing each other in an X-axis direction and is positioned within a range of one half of a distance between the first magnet and the second magnet opposing each other in Y-axis direction when a shaft core of a relative rotation between the stator and the rotor corresponds to a Z-axis, a shaft core of the magnetic sensing direction intersecting the Z-axis corresponds to the X-axis, and a shaft core which is perpendicular to the Z-axis and X-axis corresponds to the Y-axis.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
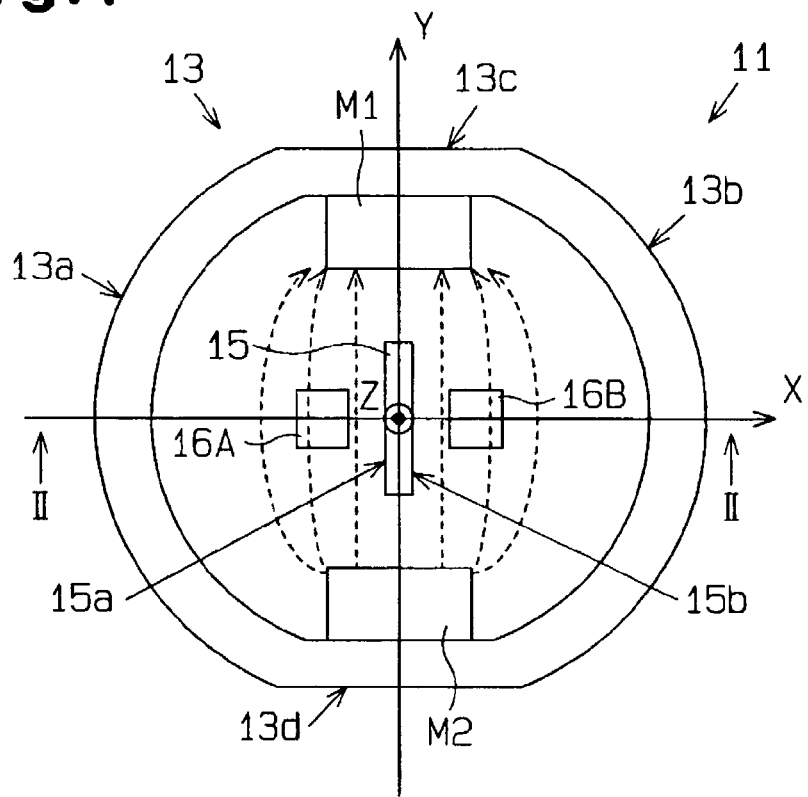
FIG. 1 is a plane view of an angular sensor according to a first embodiment of the present invention.

Two embodiments of an angular sensor is explained with reference to the illustrations in the drawing figures. A first embodiment of the angular sensor according to the present invention is explained referring to FIGS. 1–4.

Figure 2:
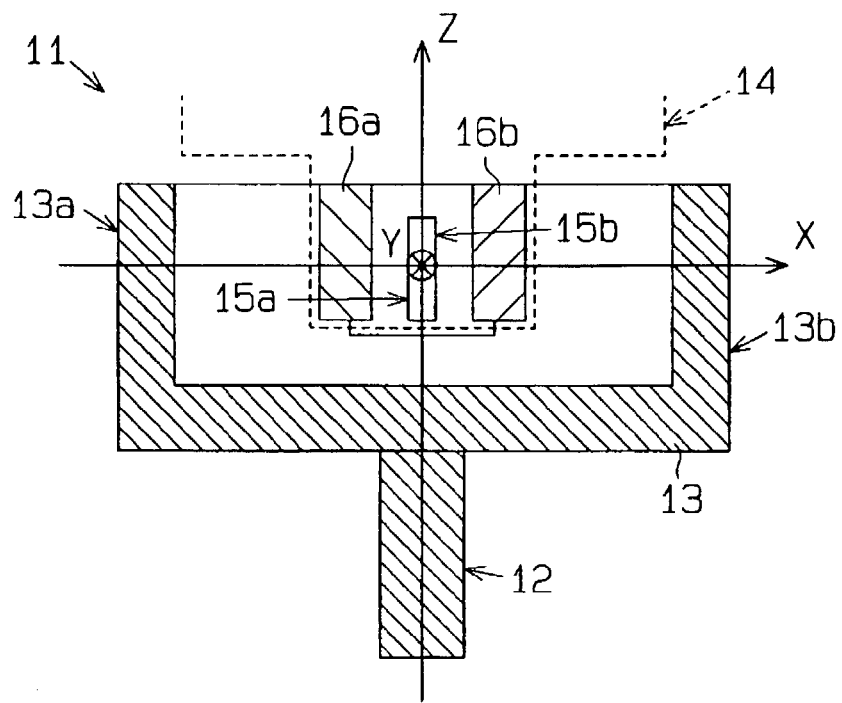
FIG. 2 is a cross-sectional view taken on line II—II of FIG. 1.

FIG. 1 is a plane view of an angular sensor 11 and FIG. 2 is a cross-sectional view of FIG. 1 taken on line II—II of FIG. 1. The angular sensor 11 is assembled to a stator 14 and a rotational shaft 12 and positioned relatively rotatable to the stator 14 for detecting a rotational angle of the rotational shaft 12. The angular sensor 11 includes a cylindrical yoke (i.e., rotor) 13 made of magnetic material, a first magnet M1 which is configured to be rectangular and installed on an internal peripheral surface of the cylindrical yoke 13, and a second magnet M2 which is configured to be rectangular and installed on an internal peripheral surface of the cylindrical yoke 13 opposing the first magnet M1. A magneto-electric transducer element (i.e., hall element) 15 is fixed on the stator 14 to have a relative rotational angle relative to the rotation of the cylindrical yoke 13 in the magnetic field generated between the first magnet M1 and the second magnet M2 in the cylindrical yoke 13. The magneto-electric transducer element 15 includes magnetic flux sensing surfaces which are perpendicularly positioned relative to the magnetic sensing direction for sensing the passing magnetic flux. The magneto-electric transducer element 15 outputs an electric signal in accordance with the magnetic sensing direction element of the passing magnetic flux density and detects a rotational angle θ of the rotational shaft 12 (i.e., cylindrical yoke 13) relative to the stator 14 by the electric signal. In FIG. 1, a Z-axis corresponds to the rotational shaft core of the rotational shaft 12, an X-axis corresponds to the shaft core in the magnetic sensing direction intersecting with the Z-axis, and a Y-axis corresponds to the shaft core in the perpendicular direction relative to the Z-axis and the X-axis.

The cylindrical yoke 13 having a bottom is connected to the rotational shaft 12 in a unitary manner. The cylindrical yoke 13 reduces existing magnetic field on the external peripheral side (i.e., opposite surfaces of the surfaces of the first and the second magnets facing the hall element 15) of the first magnet M1 and the second magnet M2. Thus, the strength of the magnetic field generated around the hall element 15 is increased and the output of the hall element 15 is increased. The basic function of the angular sensor 10 is not deteriorated even if the cylindrical yoke 13 not provided. An axis of rotation of the cylindrical yoke 13 corresponds to an axis of rotation(i.e., Z-axis) of the rotational shaft 12 and unitary rotates with the rotational shaft 12 along with the rotation of the rotation shaft 12 having an axis of rotation (i.e., Z-axis) as the rotational center. The cylindrical yoke 13 includes arc portions 13a, 13b and plane wall portions 13c, 13d which are in parallel each other.

The first magnet M1 is secured to the internal peripheral surface of the plane wall portion 13c of the cylindrical yoke 13. The second magnet M2 is secured to the internal peripheral surface of the plane wall portion 13d and is arranged asymmetrically against the first magnet M1 in response to the X-axis as the central shaft line in FIG. 1. Dimension (i.e., width, thickness in the magnetized direction, height) of the first and the second magnets M1, M2 corresponds to 3 mm, 5.2 mm, 5 mm. The first magnet M1 and the second magnet M2 have a distance with each other by 10 mm. One side of the first magnet M1 which is secured to the plane wall portion 13c is magnetized to be N-pole and the other side of the first magnet M1 is magnetized to be S-pole. One side of the second magnet M2 which is secured to the plane wall portion 13d is magnetized to be S-pole and the other side of the second magnet M2 is magnetized to be N-pole. Thus, the magnetic filed deriving from the first magnet M2 towards the second magnet M1 is formed as shown with a dotted arrow in the cylindrical yoke 13 in FIG. 1. When the rotation shaft 12 is rotated, the first and the second magnets M1, M2 are rotated having the Z-axis as an axis of rotation.

The magneto-electric transducer element 15 corresponding to the hall element is fixed to the stator 14 so that the center of the cylindrical yoke 13, that is the intersection point of the X-axis, the Y-axis, and the Z-axis in FIG. 1 corresponds to the center of the hall element 15. The stator 14 has a configuration indicated with a dotted line of FIG. 2. The hall element 15 is provided in the stator 14 by polymer forming technology. Dimension (i.e., X-axis direction, Y-axis direction, Z-axis direction) of the hall element 15 corresponds to 1.5 mm, 4.0 mm, 4.0 mm. The magnetic sensing direction for sensing the passing magnetic flux by the hall element 15 corresponds to the X-axis direction. Two surfaces perpendicular to the X-axis of the hall element 15 correspond to a first magnetic flux sensing surface 15a and a second magnetic flux sensing surface 15b. That is, only perpendicular direction element of the magnetic flux having relative to the first magnetic flux sensing surface 15a and the second magnetic flux sensing surface 15b (i.e., the magnetic flux density element in X-axis direction) is outputted into the electric signal. The hall element 15 does not output the electric signal even if the magnetic flux (i.e., magnetic flux in Y-axis direction) which is in parallel with the first magnetic flux sensing surface 15a and the second magnetic flux sensing surface 15b passes through the hall element 15.

Figure 6:
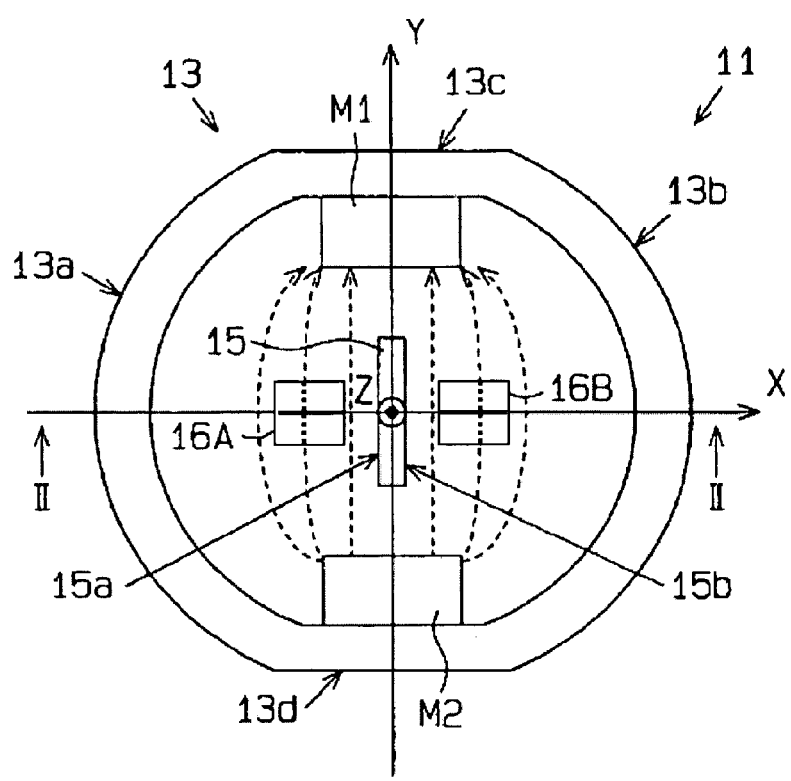
FIG. 6 is a plane view of an angular sensor according to an embodiment of the invention showing relative lengths of the deflection yokes with respect to different axes.

A first deflection yoke 16A and a second deflection yoke 16B for correcting the direction of the magnetic flux which passes through the hall element 15 are provided facing the first magnetic flux sensing surface 15a and the second magnetic flux sensing surface 15b respectively. The deflection yokes 16A, 16B are provided in the stator 14 by polymer forming likewise the hall element 15. The deflection yokes 16A, 16B are made of soft magnetic material and dimension (i.e., X-axis direction, Y-axis direction, Z-axis direction) corresponds to 2.0 mm, 2.0 mm, 5.0 mm. In accordance with a further embodiment, as illustrated in FIG. 6, the dimensions of one or more of the deflection yokes 16A,16B are such that the dimension in the X-axis direction is longer than the dimension in the Y-axis direction. The first deflection yoke 16A and the second deflection yoke 16B are fixed to the stator 14 so that the first deflection yoke 16A and the second deflection yoke 16B are on a line which is in parallel with the X-axis. Thus, the magnetic flux passing through the hall element 15 is likely to be deflected toward the magnetic sensing direction.

According to the first embodiment of the present invention, the deflection yokes 16A, 16B are positioned within the range of three quarters of the distance between the first magnet M1 and the second magnet M2 in X-axis direction and within the range of the one half of the distance between the first magnet M1 and the second magnet M2 in Y-axis direction.

Figure 4:
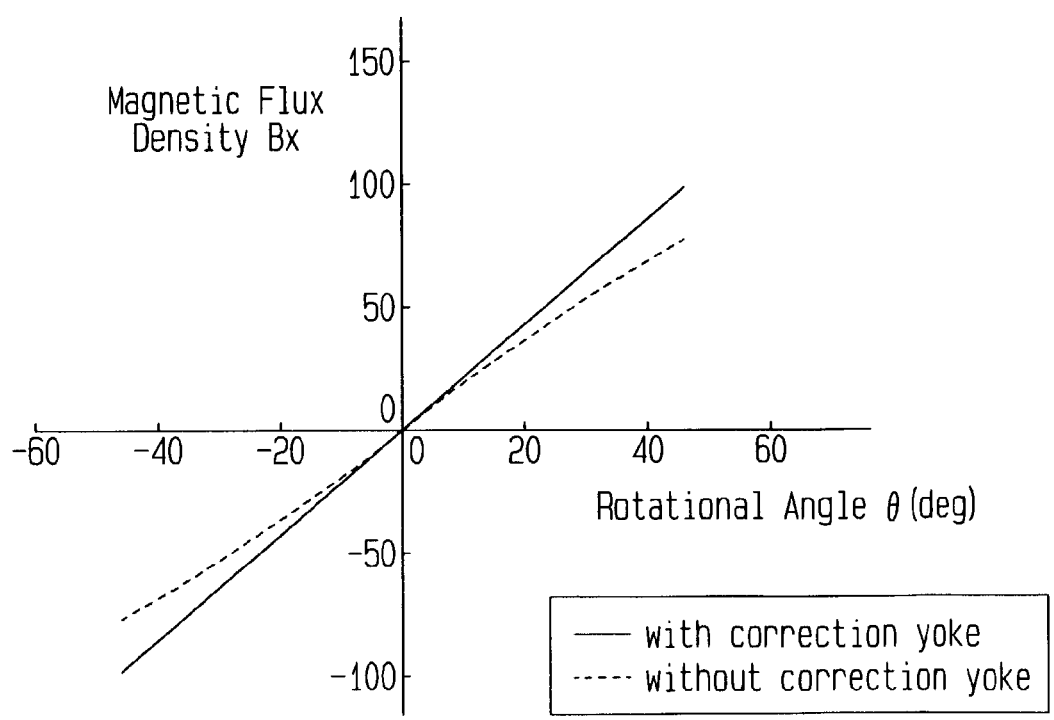
FIG. 4 is a graph showing a relationship between a magnetic flux density and a rotational angle of the angular sensor according to the first embodiment of the present invention.

The operation of the angular sensor 11 mentioned above is explained as follows. FIG. 4 is a graph for showing the relationship between the rotational angle θ of the angular sensor 11 according to the first embodiment and the X-axis element (i.e., magnetic sensing direction element) Bx passing through the hall element 15. With the first embodiment of the angular sensor of the present invention, the detectable angle of the angular sensor 11 is predetermined from −45 degree (i.e., the condition that the rotational shaft is rotated in the counterclockwise direction by 45 degree from the condition shown in FIG. 1) to +45 degree (i.e., the condition that the rotation shaft is rotated in the clockwise direction by 45 degree from the condition shown in FIG. 1). For explanatory purpose of the effect of the deflection yokes 16A, 16B, FIG. 4 shows the relationship between the rotational angle θ and the X-axis element Bx of the magnetic flux of the angular sensor which is not provided with the deflection yokes 16A, 16B.

In case the deflection yokes 16A, 16B are not provided, the magnetic flux from the first magnet M2 to the second magnet M1 is rotated relative to the hall element 15 and the X-axis element of the magnetic flux relative to the rotational angle θ corresponds to a sine wave. On the contrary, with the angular sensor 11 provided with the deflection yokes 16A, 16B, because the magnetic sensing directional element of the magnetic flux passing through the hall element 15 is corrected by the deflection yokes 16A, 16B, the X-axis element of the magnetic flux is changed compared to the case without deflection yokes 16A, 16B. By adjusting this change, the X-axis element of the magnetic flux can be proportional to the rotational angle θ.

The deflection of the magnetic flux direction by the deflection yokes 16A, 16B is explained as follows. When the rotational angle θ is within the range from −45 degree to 45 degree, the shortest distance between the deflection yokes 16A, 16B and each of magnets M1,M2 respectively is gradually shortened as an absolute rotational angle |θ| is increased. Thus, the shortest distance between the deflection yokes 16A, 16B and each magnet M1,M2 respectively is the longest under the condition that the rotational angle θ shown in FIG. 1 is zero. When the rotational shaft 12 is rotated from the condition in FIG. 1, the shortest distance is gradually shortened as the absolute rotational angle |θ| of the rotational shaft 12 is increased. Because the influence of the magnetic flux received by the deflection yokes 16A, 16B is affected strongly as the shortest distance is shortened, the magnetic flux direction can be corrected greater by the deflection yokes 16A, 16B, as the distance between the deflection yokes 16A, 16B and each magnet M1, M2 is short. As explained above, because the X-axis element of the magnetic flux relative to the rotational angle θ when the deflection yokes 16A, 16B are not provided corresponds to the sine wave, the X-axis element of the magnetic flux deviated from the line is increased as the rotational angle θ is increased when the deflection yokes 16A, 16B are not provided. On the other hand, when the deflection yokes 16A, 16B are provided, because it is structured to increase the deflection force in the magnetic flux direction by the deflection yokes 16A, 16B as the increase of the rotational angle θ, the deviation of the X-axis relative to the sine wave can be appropriately corrected to achieve the linear relationship between the X-axis element of the magnetic flux and the rotational angle θ as shown in FIG. 4.

Figure 3:
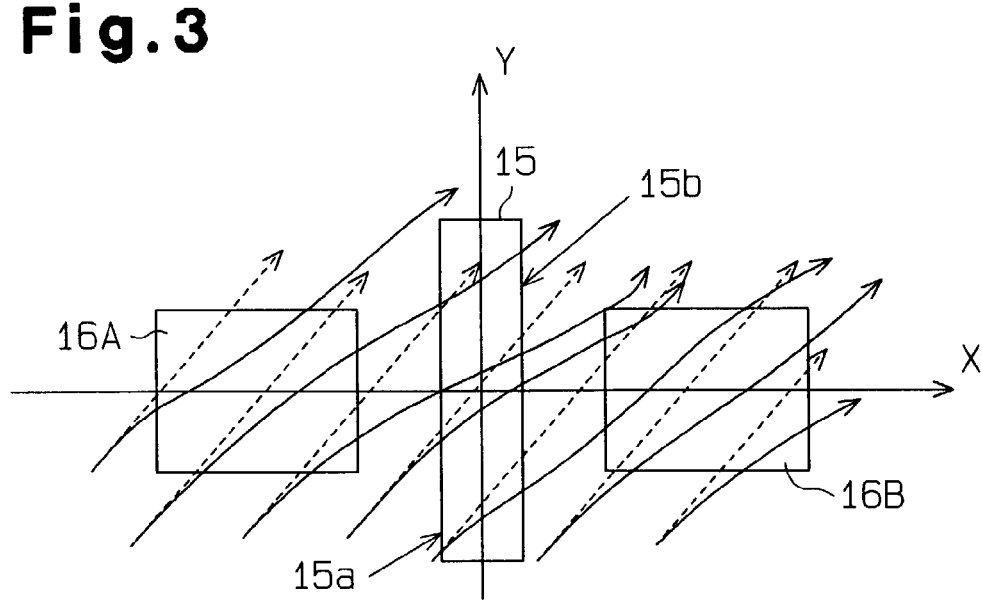
FIG. 3 is a enlarged view of an angular sensor portion according to the first embodiment of the present invention.

The deflection of the X-axis element of the magnetic flux by the deflection yokes 16A, 16B are further explained. FIG. 3 is a enlarged view of the hall element 15 and the deflection yokes 16A, 16B of the angular sensor 11, in which the rotational angle θ corresponds to 45 degree. In FIG. 3, the magnetic flux direction in case of the angular sensor without the deflection yokes 16A, 16B is shown with a dotted line and the magnetic flux direction of the angular sensor with the deflection yokes 16A, 16B is shown with a solid line. A shown in FIG. 3, when the rotational angle θ is 45 degree, the magnetic flux direction of each magnet M1, M2 has an angle of 45 degree relative to the X-axis. Thus, the magnetic flux passes through the hall element 15 having the angle of 45 degree relative to the magnetic flux sensing surface 15a of the hall element 15. Because the deflection yokes 16A, 16B are positioned facing the first magnetic flux sensing surface 15a and the second magnetic flux sensing surface 15b respectively, the direction of the magnetic flux in the cylindrical yoke 13 is corrected from the dotted line arrow direction to the solid line arrow direction by the magnetic flux deflection with the deflection yokes 16A, 16B. By this deflection, the direction of the magnetic flux passing from the first magnetic flux sensing surface 15a to the second magnetic flux sensing surface 15b is displaced to the magnetic sensing direction side relative to the dotted arrow direction. That is, with this deflection, the X-axis element of the magnetic flux is increased relative to the case that the angular sensor is not provided with the deflection yokes 16A, 16B. Because the X-axis element of the magnetic flux is zero when the rotational angle θ is zero, the X-axis element of the magnetic flux is zero even if the magnetic flux deflection is performed by the deflection yokes 16A, 16B. That is, when the rotational angle θ is zero, the X-axis element of the magnetic flux is zero because the magnetic flux derived from the first deflection yoke 16A to the second deflection yoke 16B does not exist. When the rotational angle θ is increased, the direction of the magnetic flux deflected by the deflection yokes 16A, 16B is intersected with the magnetic flux sensing surface s 15a, 15b to generate the X-axis element in the magnetic flux. In the foregoing manner, the direction of the magnetic flux is corrected in the direction in which the X-axis element Bx of the magnetic flux is increased between the first deflection yoke 16A and the second deflection yoke 16B which are positioned having directionality in the X-axis direction. The X-axis element of the magnetic flux increased by the deflection when the rotational angle θ is within the range from zero degree to 45 degree becomes maximum under the condition when the rotational angle θ is 45 degree as shown in FIG. 3. The foregoing condition is provided due to the following reason. As mentioned above, the absolute rotational angle |θ| of the rotational shaft 12 is increased, the more effectively the magnetic flux deflection by the deflection yokes 16A, 16B is performed. In addition, because the first deflection yoke 16A is aligned into line with the second deflection yoke 16B to X-axis direction, the magnetic anisotropy of the configuration is generated in X-axis direction, the magnetization is likely to happen in X-axis direction, and thus, the direction of the magnetic flux passing through the hall element 15 in the X-axis direction is easy to deflect. Accordingly, as shown in FIG. 4, the X-axis element of the magnetic flux passing through the magnetic flux sensing surfaces 15a, 15b relative to the rotational angle θ is compensated to be linear.

As mentioned above, according to the first embodiment of the angular sensor of the present invention, it is not necessary to configure the deflection yokes 16A, 16B along the magnets M1, M2 and the deflection yokes 16A, 16B are positioned within the range of three quarters of the distance between the first magnet M1 and the second magnet M2 in the X-axis direction and within the range of the one half of the distance between the first magnet M1 and the second magnet M2 in the Y-axis direction. This shows the angular sensor does not need to design intricately. In addition, because the size of the deflection yokes 16A, 16B can be reduced compared to the stator shown in the known device, this is advantageous to the miniaturization of the angular sensor. Furthermore, because the rectangular magnets M1, M2 which require lower manufacturing cost are applied instead of the annular magnet, this is advantageous to reduce the manufacturing cost. Thus, according to the first embodiment of the angular sensor of the present invention, the angular sensor 11 which is able to obtain the output signal proportional to the rotational angle θ can be provided with low manufacturing cost and which is reduced in size.

Figure 5:
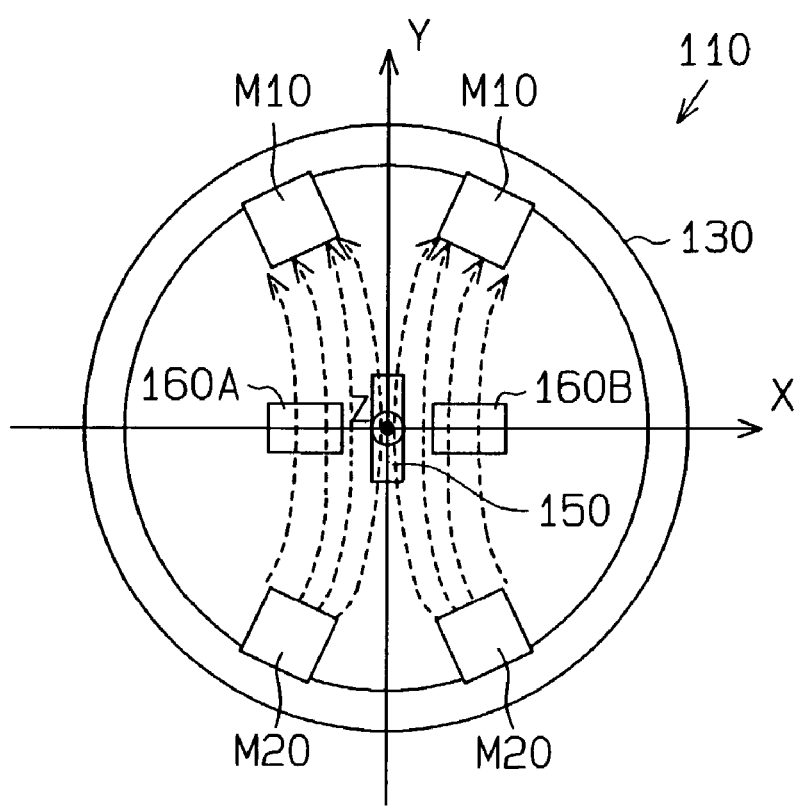
FIG. 5 is a plane view of the angular sensor according to a second embodiment of the present invention.

A second embodiment of the angular sensor of the present invention is explained referring to FIG. 5. With an angular sensor 110 according to the second embodiment of the present invention, the construction of magnets M10, M20, the configuration of a cylindrical yoke 130, and dimension of deflection yokes 160A, 160B are different compared to the first embodiment of the angular sensor shown in FIGS. 1–4. Because the other constructions of the angular sensor 110 is the same with the angular sensor 11 of the first embodiment, the explanation is omitted.

As shown in FIG. 5, the first magnet M10 includes two magnets and each piece of first magnet M10 is applied to the internal peripheral surface of the cylindrical yoke 130 keeping a predetermined distance in the peripheral direction from each other. The second magnet M20 also includes two magnets and each piece of the second magnet M20 is applied to the internal peripheral surface of the cylindrical yoke 130 keeping a predetermined distance in the peripheral direction from each other. The distance between the first magnet M10 and the second magnet M20 which is opposing the first magnet M10 corresponds to 12 mm. Dimension (i.e., width, thickness in magnetizing direction, height) of the first magnet M10 and the second magnet M20 corresponds to 2.6 mm, 2.0 mm, 5.0 mm. Dimension (i.e., X-axis direction, Y-axis direction, Z-axis direction) of the deflection yokes 160A, 160B corresponds to 2.2 mm, 0.6 mm, 5.0 mm. The dimension of the hall element 150 is the same with the hall element 15 in the first embodiment. Thus, according to the second embodiment of the angular sensor of the present invention, the deflection yokes 160A, 160B are positioned within the range of one half of the distance between the first magnet M10 and the second magnet M20 in the Y-axis direction and within the three quarters of the distance between the first magnet M10 and the second magnet M20 in the X-axis direction.

With the foregoing construction of the magnets, because the magnetic flux distribution between the first magnet M10 and the second magnet M20 is nearly homogeneous, the fluctuation of the output of the hall element 150 is small even if the rotation center of the cylindrical yoke 130 deviates from the center of the stator due to the dimensional tolerance and during the assembling. Thus, the linear relationship between the rotational angle θ and the X-axis element Bx of the magnetic flux as shown in FIG. 4 can be maintained even if the slight positional displacement of the cylindrical yoke 130 and the stator is generated.

Further, with the second embodiment of the angular sensor of the present invention, because the length of the deflection yokes 160A, 160B in X-axis direction (i.e., 2.2 mm) is longer than the length of the deflection yokes 160A, 160B in Y-axis direction (i.e., 0.6 mm), the deflection yokes 160A, 160B is likely to be magnetized in X-axis direction. Thus, this is more effective to compensate the sine wave output to be linear, the relationship of the output of the relative rotational angle θ and the hall element 150 can be linear, and thus the angular sensor 110 can be miniaturized by the deflection yokes 160A, 160B shown in FIG. 5.

The present invention is not limited to the foregoing embodiments and can be varied as follows. The configuration of the deflection yoke shown with the plane view of FIG. 1 and FIG. 5 may be changed to be any configuration such as an oval and lozenge instead of rectangular, and it is preferable to have the configuration which has the directionality in perpendicular direction relative to each magnetic flux sensing surface of the hall element. Furthermore, the first deflection yoke and the second deflection yoke may be constructed with plural yokes respectively.

According to the angular sensor of the present invention, the electric signal proportional to the degree of the relative rotational angle between the rotor and the stator can be outputted. That is, by the deflection of the magnetic flux by the deflection yoke, the density and the direction of the magnetic flux passing through the magneto-electric transducer element can be corrected so that the linear relationship is achieved between the degree of the relative rotational angle and the magnetic sensing directional element of the magnetic flux density. In addition, because the deflection yoke performing the foregoing magnetic flux deflection is predetermined to be positioned within the range of one half of the distance between the first magnet and the second magnet in the Y-axis direction and within three quarters of the distance between the first magnet and the second magnet in the X-axis direction, it is not necessary to configure the deflection yoke along the internal diameter of the magnet and it is not necessary to increase the size of the sensor. Thus, the angular sensor which enables to achieve the linear relationship between the degree of the relative rotational angle and the magnetic sensing direction of the magnetic flux and which reduces in size can be provided with low manufacturing cost.

According to the angular sensor of the present invention, when the magnetic flux between the first magnet and the second magnet passes through the magneto-electric transducer element, the magneto-electric transducer element outputs the electric signal in accordance with the magnetic sensing direction element (i.e., X-axis element of the magnetic density), and the relative rotational angle between the rotor and the stator is detected based on the electric signal. Thus, when the deflection yoke is not provided, the electric signal outputted from the magneto-electric transducer element corresponds to the sine wave. According to the angular sensor of the present invention, because the deflection yoke is fixed to the stator facing the magnetic flux sensing surface of the magneto-electric transducer element, the magnetic flux around the deflection yoke is deflected to the deflection yoke and the magnetic flux density and the direction of the magnetic flux passing around the magneto-electric transducer element is changed compared to the case when the deflection yokes are not provided. Because the magnetic flux passing through the magneto-electric transducer element is corrected by the deflection yokes, the magnetic sensing direction element of the magnetic flux density around the magneto-electric transducer element is not proportionate to the sine wave element of the relative rotational angle between the rotor and the stator but instead, the magnetic sensing directional element of the magnetic flux is proportional relative to the degree of the relative rotational angle. That is, the liner relationship between the degree of the relative rotational angle and the magnetic electric sensing direction element of the magnetic density can be achieved. With this configuration, it is set that the electric signal proportional to the degree of the relative rotational angle between the rotor and the stator is outputted. In other words, the density and the direction of the magnetic flux passing through the magneto-electric transducer element can be corrected so that the linear relationship between the degree of the relative rotational angle and the magnetic electric sensing directional element of the magnetic flux density is achieved by the deflection of the magnetic flux by the deflection yoke. The deflection yoke for performing the magnetic flux deflection is set within the range of the three quarters of the direction between the first magnet and the second magnet which are opposing each other in X-axis direction and within the range of one half of the distance between the first magnet and the second magnet. Thus, it is not necessary to configure the deflection yoke to have a configuration along the internal diameter of the magnet and the size of the magnet can be reduced. Accordingly, according to the angular sensor of the present invention, the angular sensor which can realize the linear relationship between the degree of the relative rotational angle and the size of the magnetic flux in magnetic sensing direction with low manufacturing cost and the downsizing of the sensor can be achieved.

According to the angular sensor of the present invention, by configuring the first magnet and the second magnet to be rectangular, it is not necessary to use the annular magnet and thus the manufacturing cost of the magnet and the manufacturing cost of the angular sensor as a whole can be reduced.

According to the angular sensor of the present invention, by configuring the first magnet with two magnets and configuring the second magnet with two magnets and positioning each magnet of the first magnet to be fixed to the rotor keeping a predetermined distance from each other and positioning each magnet of the second magnet to be fixed to the rotor keeping a predetermined distance from each other, the uniformity of the magnetic flux generated between the first magnet and the second magnet is increased. Thus, the output fluctuation of the magneto-electric transducer element due to the slight positional displacement of the rotor and the stator can be reduced and the deterioration of the detection precision of the angular sensor can be restrained.

According to the angular sensor of the present invention, by positioning the deflection yoke on the Z-axis and by positioning the magneto-electric transducer element offset from the Z-axis, the density and the direction of the magnetic flux passing through the magneto-electric transducer element can be effectively corrected even if only one deflection yoke is provided, the number of the parts can be reduced and thus it is advantageous to the cost reduction and the downsizing of the angular sensor.

According to the angular sensor of the present invention, the magnetic flux sensing surface of the magneto-electric transducer element includes a first magnetic flux sensing surface and a second magnetic flux sensing surface which are provided on two sides of one magneto-electric transducer element and the deflection yoke includes a first deflection yoke facing the first magnetic flux sensing surface and a second deflection yoke facing the second magnetic flux sensing surface. Thus, the distribution of the magnetic flux density between the first deflection yoke and the second deflection yoke becomes relatively uniform and the angular sensor with less fluctuation from the desired characteristics can be achieved even when the position of the magneto-electric transducer element is deviated due to the misassembling.

According to the angular sensor of the present invention, by positioning the center of the deflection yoke and the magneto-electric transducer element on the X-axis, the distribution of the magnetic flux density between the first deflection yoke and the second deflection yoke becomes further uniform and the angular sensor with less fluctuation from the desired characteristics can be achieved even when the position of the magneto-electric transducer element is deviated due to the misassembling.

Because the deflection yoke is apt to be magnetized in the longitudinal direction, by elongating the length of the deflection yoke in X-axis direction longer than the length of the deflection yoke in Y-axis direction, the effect for correcting the sine wave output to be liner can be increased. Thus, the relationship between the relative rotation angle and the output of the magneto-electric transducer element can be linear with small deflection yoke and the downsizing of the angular senor can be achieved.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An angular sensor comprising:
   a stator;
   a rotor relatively rotatable to the stator on a z-axis;
   a first rectangular magnet fixed to the rotor;
   a second rectangular magnet fixed to the rotor opposing the first magnet;
   a magneto-electric transducer element fixed to the stator on the Z-axis to be positioned in a magnetic field generated between the first magnet and the second magnet, having a sensing surface which senses a magnetic flux density whose direction is in an X-axis perpendicular to the Z-axis, and operable to output an electric signal representative of the component of the X-axis direction of the magnetic flux density; and
   a deflection yoke made of magnetic material and fixed to the stator to be positioned in the magnetic field generated between the first magnet and the second magnet;
   wherein the first magnet has one magnetic pole which is facing the Z-axis and is magnetized to be an S-pole;
   the second magnet has one magnetic pole which is facing the Z-axis and is magnetized to be an N-pole;
   the S-pole of the first magnet and the N-pole of the second magnet are facing each other; and
   the deflection yoke is positioned facing the sensing surface of the magneto-electric transducer and is positioned within a range of three quarters of a distance between the first magnet and the second magnet opposing each other in the X-axis direction which is perpendicular to the sensing surface of the magneto-electric transducer and is positioned within a range of one half of the distance between the first magnet and the second magnet opposing each other in the Y-axis direction which is parallel to the sensing surface of the magneto-electric transducer;
   wherein the first magnet includes two magnets and the second magnet includes two magnets; and
   wherein said each magnet of the first magnet is fixed to the rotor keeping a predetermined distance from each other and said each magnet of the second magnet is fixed to the rotor keeping a predetermined distance from each other.

2. An angular sensor according to claim 1, wherein a length of the deflection yoke in the X-axis direction is longer than a length of the deflection yoke in the Y-axis direction.

* * * * *